(12) United States Patent
Katz et al.

(10) Patent No.: US 9,942,246 B2
(45) Date of Patent: Apr. 10, 2018

(54) PREEMPTIVE EVENT HANDLING

(71) Applicant: Shine Security Ltd., Herzlia Pituach (IL)

(72) Inventors: Itay Katz, RaAnana (IL); Ianir Ideses, RaAnana (IL); Ron Porat, RaAnana (IL); Alon Blayer-Gat, Kiryat-Ono (IL); Oren Farage, Ramat-Gan (IL)

(73) Assignee: Shine Security Ltd., Herzlia Pituach (IL)

( * ) Notice: Subject to any disclaimer, the term of this patent is extended or adjusted under 35 U.S.C. 154(b) by 0 days.

(21) Appl. No.: 14/474,143

(22) Filed: Aug. 31, 2014

(65) Prior Publication Data

US 2015/0067859 A1 Mar. 5, 2015

Related U.S. Application Data

(60) Provisional application No. 61/872,798, filed on Sep. 2, 2013.

(51) Int. Cl.
*G08B 23/00* (2006.01)
*H04L 29/06* (2006.01)

(52) U.S. Cl.
CPC ............................... *H04L 63/1408* (2013.01)

(58) Field of Classification Search
CPC .................................................. H04L 63/1408
See application file for complete search history.

(56) References Cited

U.S. PATENT DOCUMENTS

| 6,735,772 | B1 | | 5/2004 | MacPhail | |
|---|---|---|---|---|---|
| 6,973,577 | B1 | * | 12/2005 | Kouznetsov | G06F 21/566 707/999.009 |
| 8,065,728 | B2 | * | 11/2011 | Wang | G06F 21/52 713/164 |
| 8,190,868 | B2 | * | 5/2012 | Schneider | G06F 21/566 713/164 |
| 8,401,982 | B1 | * | 3/2013 | Satish | G06F 21/566 706/12 |
| 2004/0187023 | A1 | * | 9/2004 | Alagna | G06F 21/56 726/24 |

(Continued)

FOREIGN PATENT DOCUMENTS

WO WO 2013/164821 11/2013

OTHER PUBLICATIONS

Examiner-Initiated Interview Summary dated Apr. 14, 2016 From the U.S. Patent and Trademark Office Re. U.S. Appl. No. 14/468,374.

(Continued)

*Primary Examiner* — Khoi Le

(57) ABSTRACT

A computerized method of preemptive event handling, The method comprises monitoring, in run time at kernel level, a plurality of events of a plurality of processes executed by an operating system (OS) running on a computing device, detecting, in run time, a first event of the plurality of events, the first event being performed by a first process of the plurality of processes on the computing device, classifying, in run time, the first process as a malware in response to the detection of the first event, and preventing, in run time, the first process from running on the computing device before the first event is processed by the OS.

10 Claims, 3 Drawing Sheets

(56) References Cited

U.S. PATENT DOCUMENTS

| | | | | |
|---|---|---|---|---|
| 2009/0070878 | A1* | 3/2009 | Wang | G06F 21/554 |
| | | | | 726/24 |
| 2010/0107249 | A1* | 4/2010 | Krig | G06F 21/57 |
| | | | | 726/22 |
| 2010/0132038 | A1* | 5/2010 | Zaitsev | G06F 21/552 |
| | | | | 726/22 |
| 2011/0023115 | A1* | 1/2011 | Wright | G06F 21/552 |
| | | | | 726/22 |
| 2011/0047620 | A1* | 2/2011 | Mahaffey | G06F 21/564 |
| | | | | 726/23 |
| 2012/0005115 | A1* | 1/2012 | Hofberg | G06Q 10/06 |
| | | | | 705/348 |
| 2013/0298244 | A1* | 11/2013 | Kumar | G06F 21/52 |
| | | | | 726/25 |
| 2013/0339186 | A1* | 12/2013 | French | G06F 21/577 |
| | | | | 705/26.35 |
| 2014/0115703 | A1* | 4/2014 | Penton | G06F 21/554 |
| | | | | 726/23 |
| 2015/0058988 | A1 | 2/2015 | Katz et al. | |
| 2015/0135262 | A1* | 5/2015 | Porat | G06F 21/552 |
| | | | | 726/1 |

OTHER PUBLICATIONS

Official Action dated Feb. 25, 2016 From the U.S. Patent and Trademark Office Re. U.S. Appl. No. 14/468,374.

Official Action dated Oct. 6, 2016 From the U.S. Patent and Trademark Office Re. U.S. Appl. No. 14/468,374.

Applicant-Initiated Interview Summary dated Dec. 16, 2016 From the U.S. Patent and Trademark Office Re. U.S. Appl. No. 14/468,374. (3 pages).

Advisory Action Before the Filing of an Appeal Brief dated Feb. 9, 2017 From the U.S. Patent and Trademark Office Re. U.S. Appl. No. 14/468,374. (3 pages).

* cited by examiner

PREEMPTIVE EVENT HANDLING

RELATED APPLICATION

This application claims the benefit of priority under 35 USC 119(e) of U.S. Provisional Patent Application No. 61/872,798 filed Sep. 2, 2013, the contents of which are incorporated herein by reference in their entirety.

BACKGROUND

The present invention, in some embodiments thereof, relates to malicious activity detection and/or handling and, more specifically, but not exclusively, to systems and methods of malicious activity detection and/or handling based on event monitoring.

Conventional anti-virus (AV) applications attempt to prevent harmful or malicious transmissions such as viruses and worms from infiltrating a computing device. Typically, such applications operate on a network gateway or host and monitor incoming traffic. Conventional AV applications, whether server or host based typically rely on a so-called fingerprint matching implementation. Such a fingerprint matching mechanism aggregates a set of unique indicators, or signatures, exhibited by known malicious transmissions. The unique indicators typically represent portions of files which a particular AV vendor has previously identified as malicious, such as a signature copy and used from a particular byte range in the file, or a hash computed over a predetermined portion of a file. The result is a signature value substantially shorter that the entity (file) it represents yet which has a high likelihood of matching a signature computed from another similar instance of the file. A set of signatures of known malicious transmissions is readily comparable to an incoming transmission to determine malicious content in the incoming transmission.

During the last years system and methods for integration of behavioral and signature based security have been developed.

SUMMARY

According to some embodiments of the present invention, there is provided a computerized method of preemptive event handling. The method comprises monitoring, in run time at kernel level, a plurality of events of a plurality of processes executed by an operating system (OS) running on a computing device, detecting, in run time, a first event of the plurality of events, the first event being performed by a first process of the plurality of processes on the computing device, classifying, in run time, the first process as a malware in response to the detection of the first event, and preventing, in run time, the first process from running on the computing device before the first event is processed by the OS.

Optionally, the method further comprises continuously scoring each of the plurality of processes with a process score according to the plurality of events; wherein the detecting comprises calculating an updated process score for respective the process score of the first process in response to an analysis of the first event and wherein the classifying is performed, in run time, in response to the updated process score.

More optionally, the classifying is performed when the updated process score exceeds a malware classification threshold.

Optionally, the preventing is performed in response to the classifying.

Optionally, the monitoring is performed by a kernel driver that channels the plurality of events for an analysis before the processing thereof.

More optionally, the classifying is performed by the kernel driver based on the analysis.

Optionally, the preventing is performed by a kernel driver that filters the first event.

Optionally, the method further comprises filtering safe events from the plurality of events.

Optionally, the method further comprises preventing the execution of the first process on the computing device and deleting at least one additional event associated with the first process.

Optionally, the method further comprises initiating a kernel driver before the OS is loaded; wherein the monitoring is performed by collecting the plurality of events in the kernel level in real time.

According to some embodiments of the present invention, there is provided a system of reverting system data effected by a malware. The system comprises a processor, a threat monitoring module which monitors, in run time at kernel level, a plurality of events of a plurality of processes executed by an operating system (OS) running on a computing device and detects, in run time, a first event of the plurality of events, the first event being performed by a first process of the plurality of processes on the computing device, the threat monitoring module uses the processor to classify, in run time, the first process as a malware in response to the detection of the first event, and an event dispatcher module which prevents, in run time, the first process from running on the computing device before the first event is processed by the OS.

Optionally, the event dispatcher module and the threat monitoring module are components of a kernel driver which operates in a kernel level.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
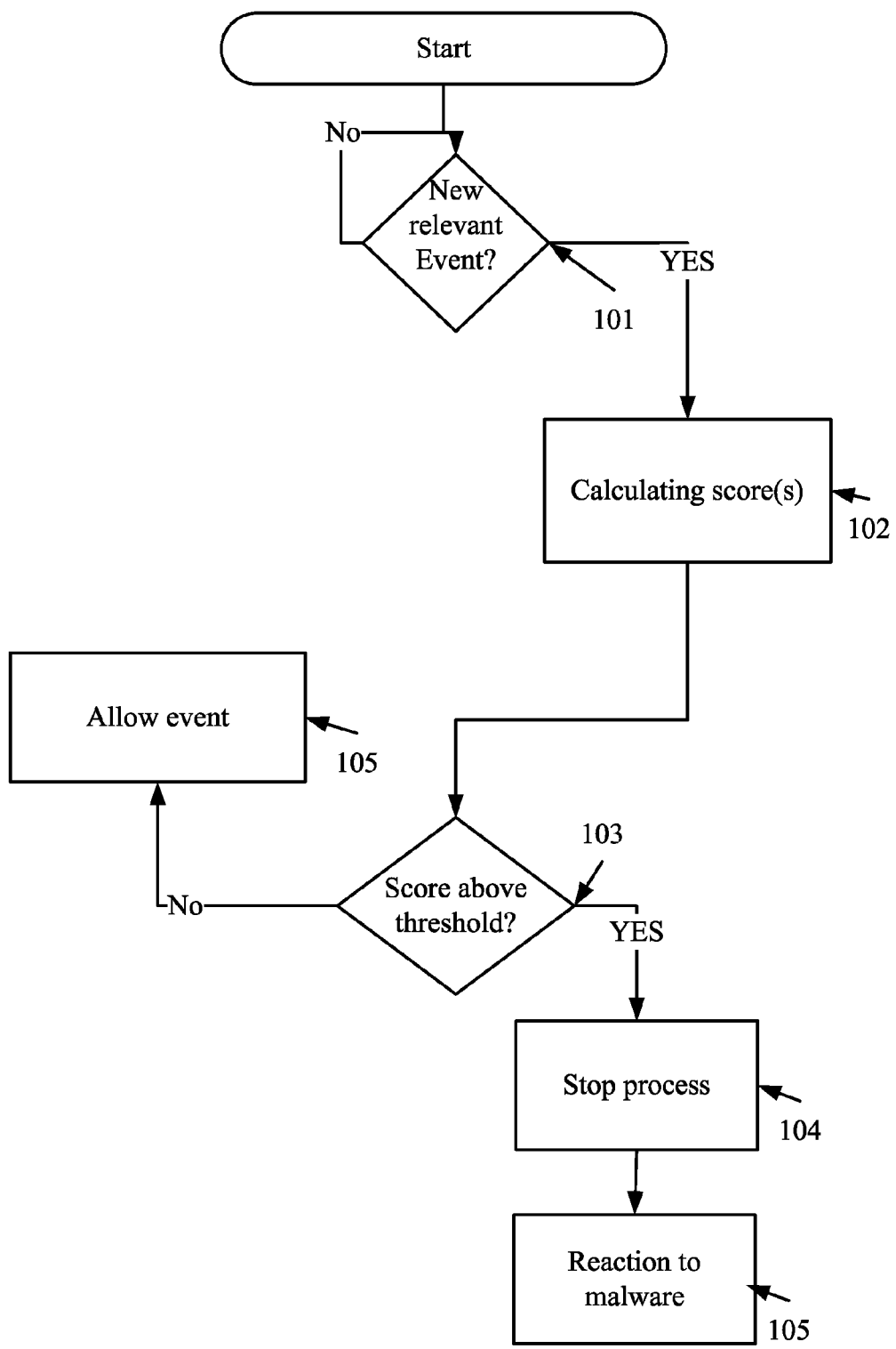
FIG. 1 is a process of preventing the processing of events by an operating system (OS) based on kernel level analysis of real time events, according to some embodiments of the present invention.

The present invention, in some embodiments thereof, relates to malicious activity detection and/or handling and, more specifically, but not exclusively, to systems and methods of malicious activity detection and/or handling based on event monitoring.

According to some embodiments of the present invention, there are provided methods and systems of predispatch filtering of event(s) which trigger the classification and/or scoring of a process as a malware, facilitating preemptive blocking of processes at detection time, before the dispatching of the triggering event(s). Optionally, a kernel level driver is used to capture and channel event(s) for process classification by pre dispatching analysis, and to filter or allow the event(s) according the process classification.

According to some embodiments of the present invention, processes are continuously scored with a malware level score. When the malware level score exceeds the malware level score, the dispatching of events of the process is immediately prevented. When the malware level score does not exceed the malware level score, the dispatching of events of the process is allowed. Optionally, a process is blocked and optionally deleted after being classified as a malware. Optionally, the effect of the process on the computing device is identified and reverted, for example as described in U.S. Patent Provisional No. 61/869,775 filed Aug. 26, 2013 which is incorporated herein by reference.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a process of preventing the processing of event(s) by an operating system (OS) based on kernel level analysis of real time events and optionally changes in the scores of process(es), according to some embodiments of the present invention. As used herein, event is defined as an action or occurrence detected by the OS or another event driven system and may be handled by the detecting system. Optionally, the monitored events includes are spontaneous events generated by the OS, for example a window™ OS, and read from a respective system queue and optionally processed one after the other by the event loop. Additionally or alternatively, the monitored events include posted events generated by Qt and/or an application and queued by the Qt and/or processed by an event loop. Additionally or alternatively, the monitored events include sent events generated by Qt and/or by the application and sent directly to a target object. Additionally or alternatively, the monitored events are originated from sources of events such as a user, a hardware device, and/or software.

The monitored events are optionally identified based on run time monitoring at the kernel level, for instance as described below and/or as described in International Patent Application No. PCT/IL2013/050366, which is incorporated herein by reference. In some embodiments, events may be detected by an event detection algorithm, using machine learning (ML) techniques, and aggregated to determine a score of process(es) executed on the monitored computing device 201, for instance as described in International Patent Application No. PCT/IL2013/050366, which is incorporated herein by reference. In these embodiments, an event which triggers the updating of a score of a process to an updated score that passes a malware classification threshold, for example a threshold that differentiate between safe software classification and a malware classification, is prevented from before dispatched and handled on the computing device 201. In such a manner, malware processes are blocked preemptively before dispatched when being detected and not after being detected.

Figure 2:
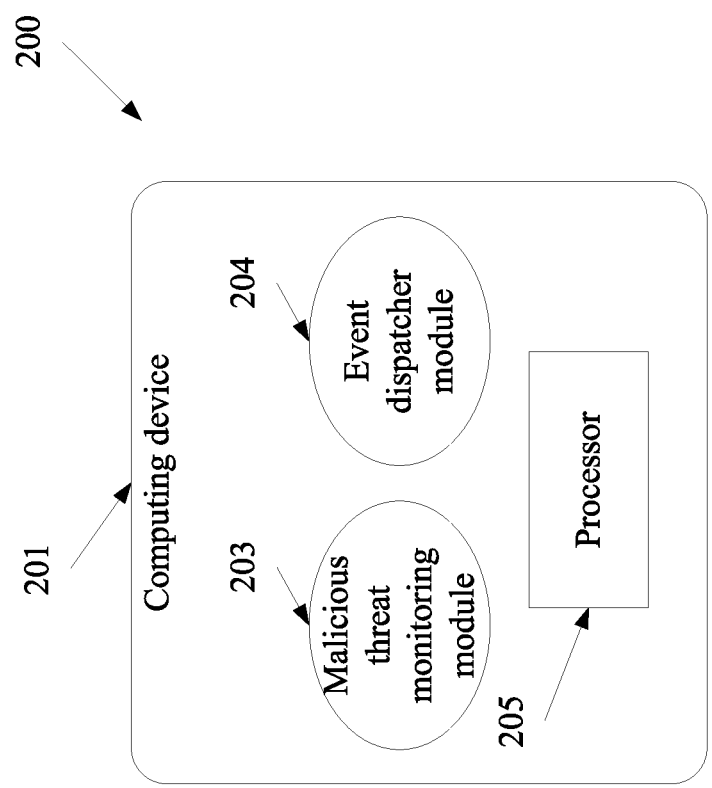
FIG. 2 is a schematic illustration of a preemptive event management system of preventing the processing of events by an operating system based on kernel level analysis of real time events in a computing device, according to some embodiments of the present invention.

Reference is also made to FIG. 2, which is a schematic illustration of a preemptive event management system 200 of preventing the processing of events by an operating system (OS) based on kernel level analysis of real time events in a computing device 201 before the dispatching thereof for handling, according to some embodiments of the present invention. The preemptive event management system 200 optionally supports the process depicted in FIG. 1 when implemented in an OS based computing device having one or more processors 205, for example a server, a laptop, a desktop, a tablet, a Smartphone, Smart TV, a Car computer, a Smart watch, a virtual machine hosted in a network node and/or the like. The preemptive event management system 200 includes a malicious threat monitoring module 203 and an event dispatcher module 204 hosted, either permanently and/or temporarily, in the computing devices 201. As further described below, the malicious threat monitoring module 203 scores and/or classifies, in real time, processes which are executed by a target system running on the computing devices 201, identifies one or more suspected events of these processes, and classifies respective process(es) accordingly. As further described below, the event dispatcher module 204 filters events, prevents the processing of events which are used to classify one or more processes executed on the computing device 201 as malicious.

In use, a plurality of events, such as events tracing for windows (ETW), which are in queue for being dispatched and handled at the computing device 201 are monitored, optionally by the malicious threat monitoring module 203. Optionally, the malicious threat monitoring module 203 channels events generated by the hosting computing device 201 for real time processing. Optionally, the malicious threat monitoring module 203 is implemented as or includes a kernel driver, for instance a driver that channels and filters events as described below with reference to FIG. 3. The kernel driver is optionally initiated before the OS is loaded and collects events in the kernel level in real time, before the dispatching thereof for handling by the OS and/or any other software. Such a kernel driver optionally has a higher priority and more authorizations than a process executed by the OS, see for example International Patent Application No. PCT/IL2013/050366, which is incorporated herein by reference.

As shown at 101, monitored events are caught in the kernel level by the preemptive event management system 200, for instance by an event catcher module 302 described with reference to FIG. 3. As shown at 101, when the caught event, also referred to as a new event, is found as relevant, for example classified as a potential malware event and/or not filtered as a safe event, it is used for scoring one or more of the running processes with malware risk scores in run time, as shown in 102. As shown at 104, when a process is scored above a certain malware classification threshold, for example as shown at 103, it is classified as a malware and the event which has triggered the classification thereof as a malware is prevented from running on the computing device 201 (also referred to as blocked) before it is processed by the OS. When no process is classified as a malware as an outcome of capturing the event, the event is allowed as shown at 105. Optionally, processes are continuously scored, for instance as long as the score does not exceed a malware classification threshold. Optionally, when a score of a process is changed without exceeding the certain malware classification threshold—as an outcome of a detection of a first event related to the process, the first event is processed. In such embodiments, when the score of the process is changed to exceeding the certain malware classification threshold—as an outcome of a detection of a second event related to the process, the second event is prevented (e.g. blocked). In such embodiments, an event that induces a score change that does not trigger a classification of the process as a malware is not blocked and an event that induces a score change that triggers a classification of the process as a malware is blocked.

Optionally, as shown at 106, a reaction to the infection of the computing device 201 with the process is initiated. For example, the process may be deleted. Additionally or alternatively, the effect(s) of the process on the OS of the computing device 201 and/or on the computing device 201, are handled, for example as described in U.S. Patent Provisional No. 61/869,775 filed Aug. 26, 2013 which is incorporated herein by reference.

Figure 3:
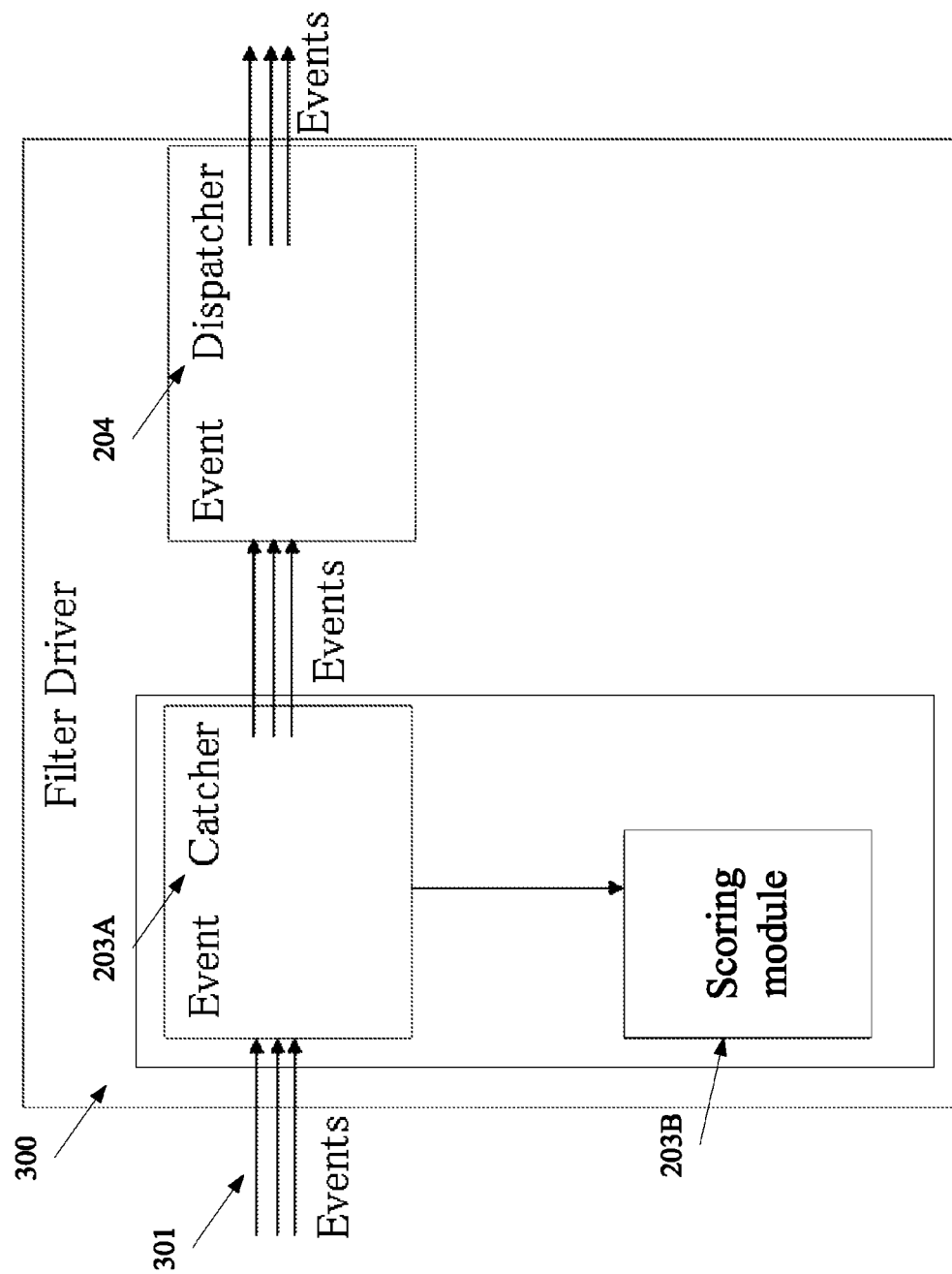
FIG. 3 is a schematic illustration of a block diagram depicting a flow of events via components of the malicious threat monitoring module and the event dispatcher module, according to some embodiments of the present invention.

Reference is now made to FIG. 3, which is a schematic illustration of a block diagram depicting a flow of events via components of the malicious threat monitoring module 203 and the event dispatcher module 204, according to some embodiments of the present invention. In these embodiments, the malicious threat monitoring module 203 and the event dispatcher module 204 are implemented as a kernel level driver, also referred to as a filter driver 300, which computes the process scores and filters events accordingly in real time, before the processing of classification triggering events, at the kernel level. As indicated in 301, events constantly generated by the OS of the monitored computing device are monitored by an event catcher 203A of the malicious threat monitoring module 203. The monitored events caught by the event catcher 203A that passes these events to a scoring module 203B of the malicious threat monitoring module 203. The scoring module 203B scores accordingly the processes, for instance as described above. The scores of the processes are optionally fed to the event dispatcher module 204 that either allows the and/or prevents the running of an event before the dispatching and handling thereof based on the effect of that event to the score(s) of the process(es) and/or based on the score(s) of the process(es) themselves before the event is executed. When a change in a score of a process derived from a detection of event(s) does not lead to scoring a process above a malware classification threshold and therefore does not prompt the detection of a malware, the event dispatcher module 204 outputs the event(s) as is. When a change in a score of a process derived from a detection of event(s) leads to a score above the malware classification threshold and therefore a malware detection is prompt, the event(s) are blocked before they cause damage.

An exemplary pseudocode of event filtering as described above is as follows:

```
While true
{
    getAction( )
    if (retrievedActionIsRelevant)
    {
        computeMalScore( )
        if (MalScore> MALWARE_ THRESHOLD)
        {
            blockEvent( )
            remediate( )
        }
        else
        {
            allowEvent( )
        }
    }
}
```

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a module, a malware, and a processor, is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of preemptive event handling, comprising:
    catching, in run time by a kernel driver at kernel level, a plurality of events of a plurality of processes before being dispatched for execution by an operating system (OS) running on a computing device;
    channeling, by said kernel driver and before processing by said OS, said plurality of events for a pre-dispatching analysis;
    continuously scoring each of said plurality of processes with a process score according to said plurality of events;
    detecting, in run time, a first event of said plurality of events, said first event being performed by a first process of said plurality of processes on said computing device;
    calculating an updated process score for respective said process score of said first process in response to an analysis of said first event;
    classifying, based on said pre-dispatching analysis, in run time, said first process as a malware in response to said detection of said first event and in response to said updated process score;
    preventing, in run time, said first process from running on said computing device before said first event is processed by said OS; and
    preventing the execution of said first process on said computing device and deleting at least one additional event associated with said first process.

2. The method of claim 1, wherein said classifying is performed when said updated process score exceeds a malware classification threshold.

3. The method of claim 1, wherein said preventing is performed in response to said classifying.

4. The method of claim 1, wherein said preventing is performed by a kernel driver that filters said first event.

5. The method of claim 1, further comprising filtering safe events from said plurality of events.

6. The method of claim 1, further comprising initiating a kernel driver before said OS is loaded; wherein said monitoring is performed by collecting said plurality of events in the kernel level in real time.

7. The method of claim 1 further comprising identifying an effect of said first process on said computing device and reverting said effect of said first process on said computing device.

8. The method of claim 1 wherein said detecting is performed by an event detection algorithm using machine learning techniques.

9. A system of reverting system data effected by a malware, comprising:
    an operating system (OS) based computing device having at least one processor;
    a threat monitoring module which catches, in run time at kernel level, a plurality of events of a plurality of processes before being dispatched for execution by an operating system (OS) running on a computing device and detects, in run time, a first event of said plurality of events, said first event being performed by a first process of said plurality of processes on said computing device, said threat monitoring module channels before processing by said OS, said plurality of events for a pre-dispatching analysis, continuously scores each of said plurality of processes with a process score according to said plurality of events, calculates an updated process score for respective said process score of said first process in response to an analysis of said first event and uses said processor to classify based on said pre-dispatching analysis, in run time, said first process as a malware in response to said detection of said first event and in response to said updated process score; and
    an event dispatcher module which prevents, in run time, said first process from running on said computing device before said first event is processed by said OS, and further prevents the execution of said first process on said computing device and deletes at least one additional event associated with said first process; wherein said event dispatcher module and said threat monitoring module are components of a kernel driver which operates in said kernel level.

10. A computer program product for preemptive event handling, comprising:
    a non-transitory computer readable storage medium;
    first program instructions executable by a computerized system to cause said computerized system to catch by a kernel driver, in run time at kernel level, a plurality of events of a plurality of processes before being dispatched for execution by an operating system (OS) running on a computing device;
    second program instructions executable by said computerized system to cause said computerized system to channel by said kernel driver and before processing by said OS, said plurality of events for a pre-dispatching analysis;
    third program instructions executable by said computerized system to cause said computerized system to continuously score each of said plurality of processes with a process score according to said plurality of events;

fourth program instructions executable by said computerized system to cause said computerized system to detect, in run time, a first event of said plurality of events, said first event being performed by a first process of said plurality of processes on said computing device;

fifth program instructions executable by said computerized system to cause said computerized system to calculate an updated process score for respective said process score of said first process in response to an analysis of said first event;

sixth program instructions executable by said computerized system to cause said computerized system to classify, based on said pre-dispatching analysis, in run time, said first process as a malware in response to said detection of said first event and in response to said updated process score; and seventh program instructions executable by said computerized system to cause said computerized system to prevent, in run time, said first process from running on said computing device before said first event is processed by said OS, and further prevent the execution of said first process on said computing device and delete at least one additional event associated with said first process;

wherein said first, second, third, fourth, fifth, sixth and seventh program instructions are stored on said non-transitory computer readable storage medium.

* * * * *